United States Patent
Mills

(10) Patent No.: US 6,872,134 B2
(45) Date of Patent: Mar. 29, 2005

(54) DASHBOARD ASSEMBLY

(75) Inventor: Michael John Mills, Warwickshire (GB)

(73) Assignee: Intier Automotive Interiors Ltd., Maidstone (GB)

( * ) Notice: Subject to any disclaimer, the term of this patent is extended or adjusted under 35 U.S.C. 154(b) by 0 days.

(21) Appl. No.: 10/296,280

(22) PCT Filed: May 23, 2001

(86) PCT No.: PCT/IB01/01285

§ 371 (c)(1),
(2), (4) Date: Jun. 2, 2003

(87) PCT Pub. No.: WO01/89871

PCT Pub. Date: Nov. 29, 2001

(65) Prior Publication Data

US 2004/0038640 A1 Feb. 26, 2004

(30) Foreign Application Priority Data

May 23, 2000 (GB) .............................. 0012314

(51) Int. Cl.$^7$ ................................. B60S 1/54
(52) U.S. Cl. ...................... 454/121; 454/143; 454/152
(58) Field of Search ................................ 454/121, 146, 454/143, 152, 156

(56) References Cited

U.S. PATENT DOCUMENTS

| | | | | |
|---|---|---|---|---|
| 3,724,357 A | * | 4/1973 | Kavthekar et al. | 454/152 |
| 5,354,114 A | * | 10/1994 | Kelman et al. | 296/192 |
| 5,487,800 A | * | 1/1996 | Ash | 156/87 |
| 5,678,877 A | * | 10/1997 | Nishijima et al. | 296/70 |
| 5,709,601 A | * | 1/1998 | Heck | 454/121 |
| 5,762,395 A | * | 6/1998 | Merrifield et al. | 296/203.01 |
| 5,904,617 A | * | 5/1999 | Dausch | 454/69 |
| 6,110,037 A | * | 8/2000 | Yoshinaka | 454/143 |
| 6,186,885 B1 | * | 2/2001 | Ahn et al. | 454/121 |
| 6,186,887 B1 | * | 2/2001 | Dauvergne | 454/152 |
| 6,508,701 B1 | * | 1/2003 | Foury et al. | 454/121 |
| 6,705,672 B2 | * | 3/2004 | Shikata et al. | 296/208 |

FOREIGN PATENT DOCUMENTS

| | | | | |
|---|---|---|---|---|
| EP | 0704329 | | 4/1996 | B60K/37/00 |
| EP | 713 798 A1 | | 5/1996 | B60K/37/00 |
| FR | 2696382 | | 4/1994 | B60K/37/00 |

* cited by examiner

Primary Examiner—Derek S. Boles
(74) Attorney, Agent, or Firm—Honigman Miller Schwartz and Cohn LLP

(57) ABSTRACT

A dashboard assembly for a vehicle comprising a lower housing portion adapted to receive an air blowing system and an upper housing portion, the dashboard assembly further comprising an intermediate housing portion being and disposed between the lower housing portion and the upper housing portion, wherein the intermediate housing portion comprises an inlet for connection to the air blowing system and at least one channel integrally provided in said intermediate housing portion and having an outlet, said channel being in flow communication with said inlet. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

12 Claims, 3 Drawing Sheets

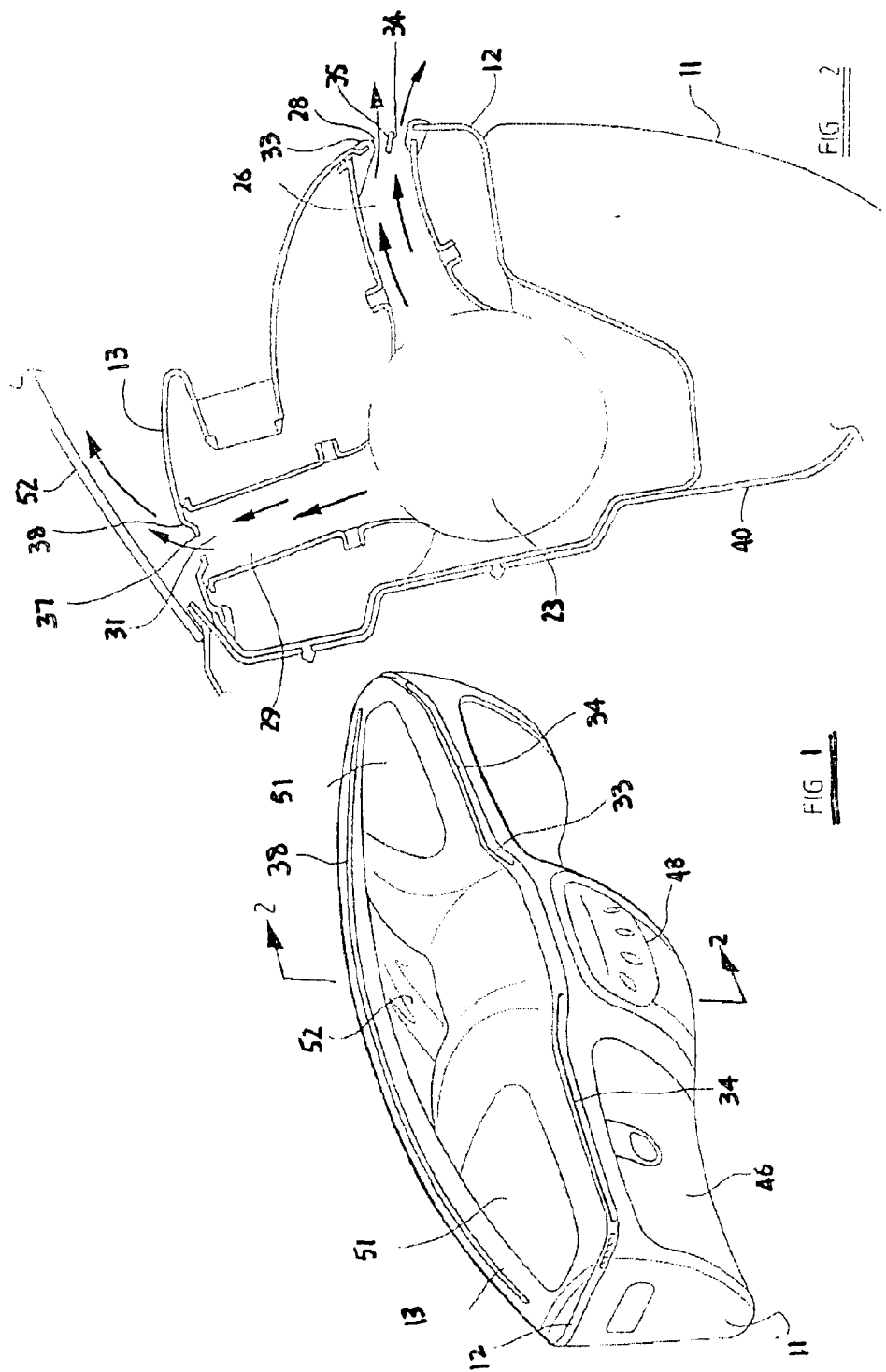

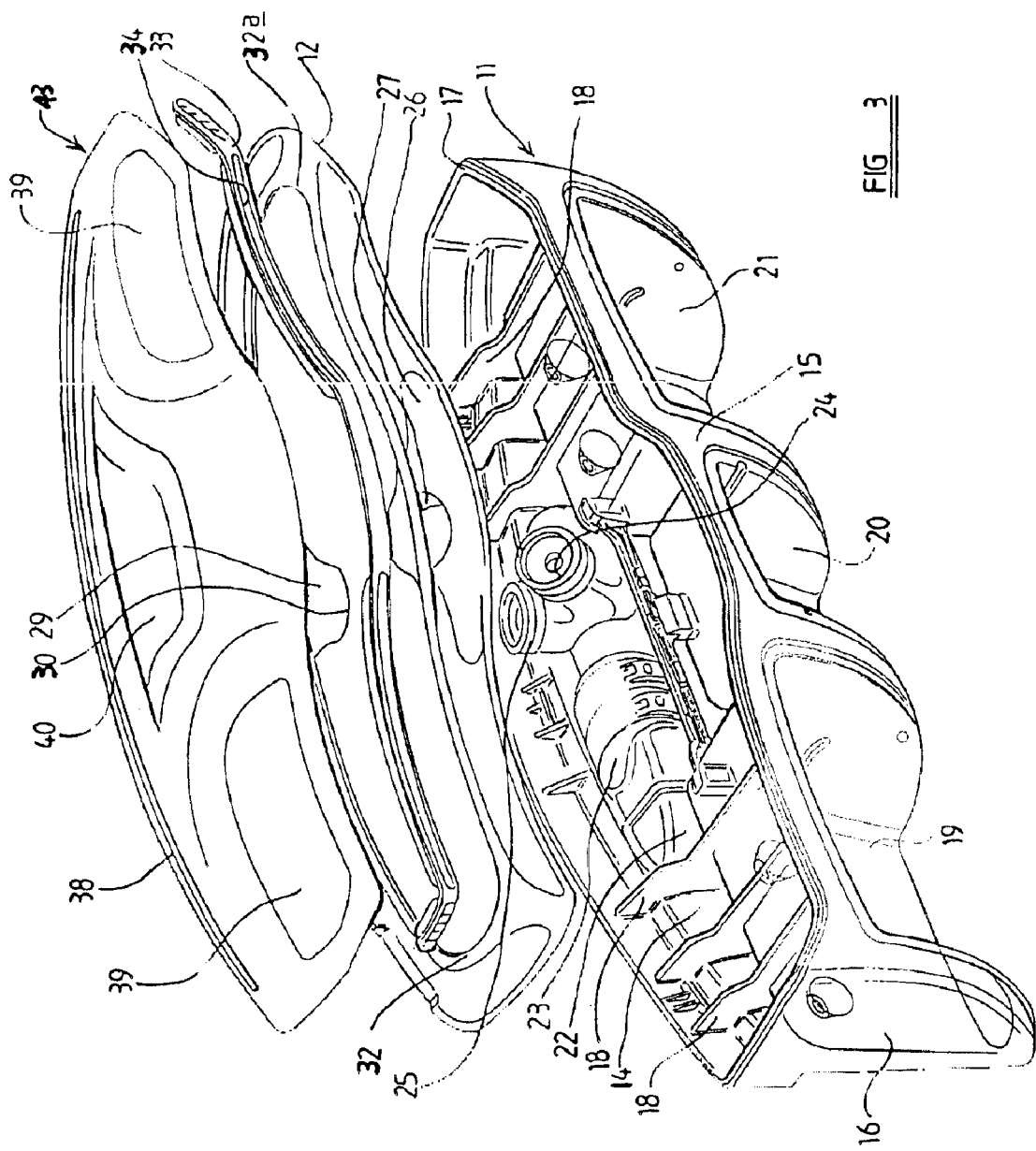
FIG_3

DASHBOARD ASSEMBLY

BACKGROUND OF THE INVENTION

1. Field of the Invention

This invention relates to a dashboard assembly for use in motor vehicles, and particularly but not exclusively for use in motor cars.

2. Description of the Related Art

To reduce the cost of manufacturing dashboard assemblies, it is desirable that the assembly be able to fit different car platforms and be adaptable to different styling themes and to accommodate both left and right hand drive models. The dashboard assembly must also be able to accommodate services such as heating, ventilation and air conditioning, and in particular air ducts as well as electrical and electronic components. A two part dashboard assembly is known from EP-A-0713798 comprising an upper portion and a lower portion in which the lower portion provides a lower part of air ducts within the assembly and the upper portion provides an upper part of the air ducts. Such a configuration however has a number of disadvantages, in that the ducts introduce structural weakness into the lower housing portion, make the assembly unfit to receiving electrical wiring due to condensation within the assembly, and does not permit the installation air bags or variation of styling or trim for inclusion in different car models.

SUMMARY OF THE INVENTION

An aim of the invention is to provide a new or improved dashboard assembly.

According to the present invention, we provide a dashboard assembly for a vehicle comprising a lower housing portion adapted to receive an air blower system, and an upper housing portion, the dashboard assembly further comprising an intermediate housing portion disposed between the lower housing portion and the upper housing portion, wherein the intermediate housing portion comprises an inlet for connection to the air blower system and at least one channel integrally provided in said intermediate housing portion, having an outlet, said channel being in flow communication with said inlet.

The upper housing unit may be provided with a demist air vent, the demist air vent being in flow communication with an outlet of the intermediate housing portion.

The dashboard assembly may comprise a compartment air vent in flow communication with an outlet of the intermediate housing position wherein air may be directed into a passenger compartment of the vehicle.

Said compartment air vent may comprise an air vent moulding sealingly secured between the intermediate housing portion and the upper housing portion in flow communication with said outlet.

The air vent moulding may extend across the width of the dashboard assembly.

The intermediate housing portion may comprise a first channel and a second channel, one of said channels being in flow communication with said demist outlet and one of said channels being in flow communication with the passenger air vent.

The air blower system may comprise a connecting sleeve and the inlet of the intermediate housing portion may comprise a connecting flange to engage said connecting sleeve.

Where the intermediate housing portion comprises a first channel and a second channel, the air blower system may comprise first and second connecting sleeves and the intermediate housing portion may comprise first and second connecting flanges, wherein the first flow channel is in flow communication with the first connecting flange and the second flow channel in flow communication with the second connecting flange.

The air blower system may be disposed centrally of the lower housing portion.

The lower housing portion may comprise an integral body with structural reinforcements, forming an open container with a joining edge on top.

The lower housing portion may comprise symmetrically arranged bays for receiving a dashboard assembly module.

The dashboard assembly module may comprise one of a glove box assembly and a steering column assembly.

The intermediate housing portion may be symmetrical.

The upper housing portion may be symmetrical.

The lower housing portion may reach down to the region of the driver's knees.

The lower housing portion may comprise a central bay to receive a central module.

BRIEF DESCRIPTION OF THE DRAWINGS

The invention will now be described by way of example only with reference to the accompanying drawings, wherein FIG. 1 is a perspective view of a dashboard assembly according to the present invention;

FIG. 2 is a part section on line 2—2 of FIG. 1;

FIG. 3 is an exploded view of the dashboard assembly of FIG. 1; and

DESCRIPTION OF THE PREFERRED EMBODIMENT

Figure 4:
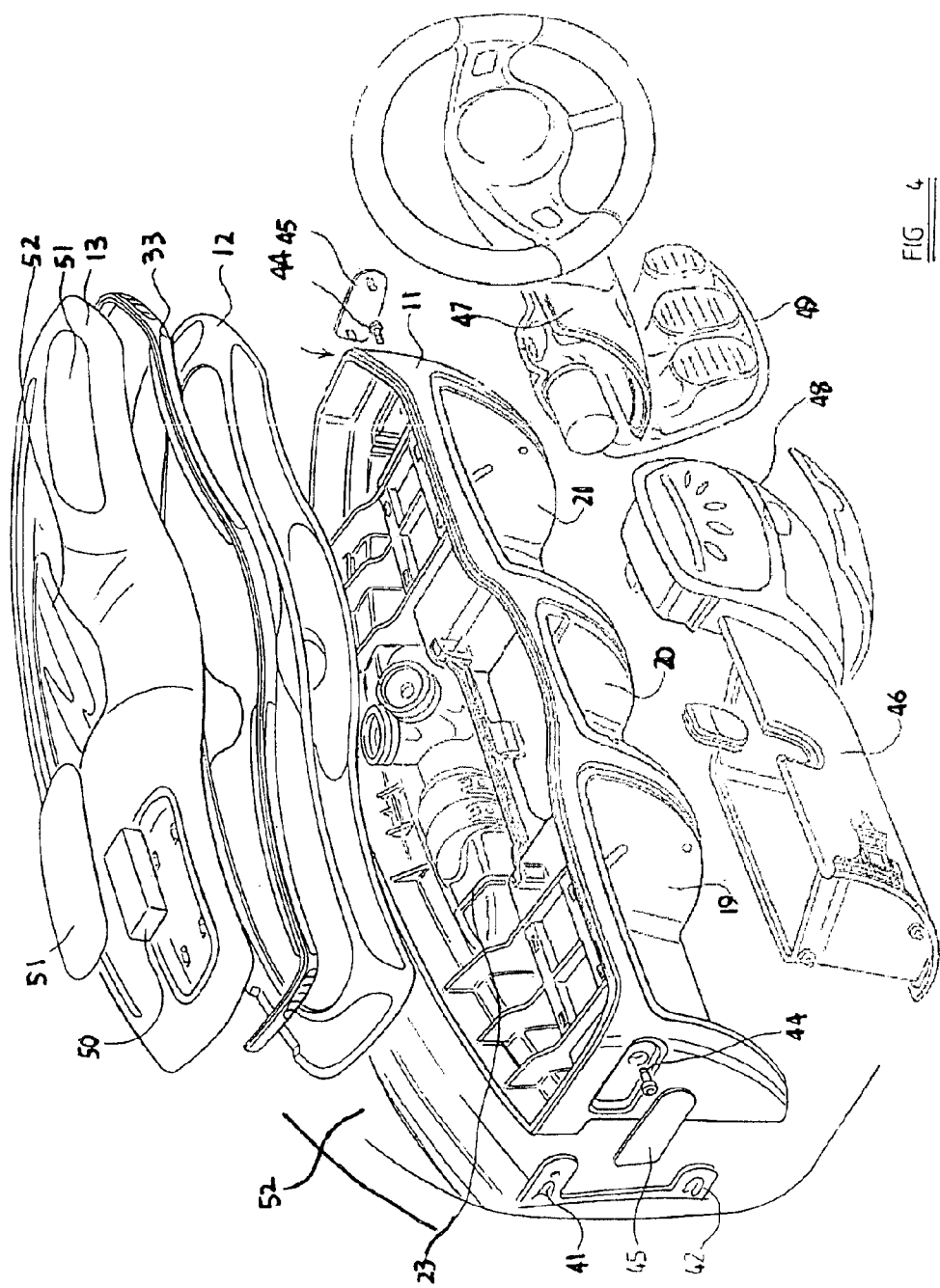
FIG. 4 is an exploded view of the dashboard assembly of FIG. 1 located in a vehicle.

Referring now to the Figures, the dashboard assembly shown generally at 10 comprising a lower housing portion 11, an intermediate housing portion 12 and an upper housing portion 13. Each portion comprises a polymer assembly, whether made by moulding or any other means as desired.

The lower housing portion 1 comprises a forward wall 14, a rearward wall 5 and side walls 16, 17. The walls 14, 15, 16, 17 define an open topped container having a joining edge on top. Interconnecting the forward wall 14 and rearward wall 15 are a plurality of stiffening struts 18. A plurality of bays 19, 20, 21 are provided in the rearward wall 15 of the lower housing portion 11, the bays 19, 20, 21 being symmetrically arranged about the rearward wall 15. The bays 19, 20, 21, the forward wall 14 and the innermost stiffening struts 18 define a recess 22 wherein an air blower unit 23 is located. The air blower unit 23 is commonly referred to as an HVAC (heating/ventilation/air conditioning) and comprises a fan and heater unit of the desired capacity for the vehicle into which the dashboard assembly is being introduced. The air blower unit 23 is provided with outlets comprising a first sleeve 24 and a second sleeve 25.

The intermediate housing portion 12 is a moulded unit integrally provided with channels to direct air supplied from the air blower system 23. A duct comprising a first channel 26 is provided in flow communication with an inlet comprising a connecting flange 27 connectable to the first sleeve 24 of the air blower system 23. The channel 26 is provided with an outlet 28 extending across the rearward part of the intermediate housing portion 12. A duct comprising a second channel 29 is in flow communication with an inlet comprising a connecting flange 30 adapted to engage the second sleeve 25 of the air blower system 23 and having an outlet 31. Integrally moulded walls 32a, 32b serve to separate the channels 26, 29.

Extending across the front of the dashboard assembly 10 is an air vent moulding 33. The air vent moulding 33 is disposed at least partly in the outlet 28 of the channel 26 and is sealingly connected between the intermediate housing portion 12 and upper housing portion 13. The air vent moulding 33 is provided with apertures 34 which are provided with louvres 35 which may be manually adjustable or otherwise as required. The air from channel 26 is thus vented through apertures 34 into a passenger compartment of a vehicle in which the dashboard assembly is located. The upper housing portion 13 is integrally provided with an upper air vent moulding 36 having an aperture 37 disposed at least partly within the outlet 31 of the channel 29. The channel 29 is shaped such that the outlet 31 abuts the upper housing portion 13 in a sealing manner.

The upper housing portion 13 is symmetrical and is provided with bays 39 to receive air bag modules and with a bay 40 to receive, in the present example, an instrument panel.

In assembling the vehicle, the dashboard assembly 10 is mounted such that the forward wall of the lower housing portion 11 as well as equivalent forward walls of the intermediate housing portion 12 and upper housing portion 13 are disposed such that they abut a bulkhead 40 of a vehicle body. Lugs 41, 42 are provided on the bulkhead 40 and are receiving in corresponding recesses 43 provided on either side of the lower housing portion 11. Connection means 44 are provided to anchor the lower housing portion 11 to the lug 41, and are then hidden by cover plates 45. Modules comprising a glove compartment 46, a steering module 47 and a central module, in the present example comprising an audio system 48, are introduced into the bays 19, 20, 21 respectively. The electrical connection for the steering column module may be of any desired appropriate type, for example, a mating type connection. A pedal module 49 is located in a foot well below the steering module 47. Air bag modules 50 are introduced into the bays 39 and covered with appropriate covers 51. Finally, an instrument panel 52 is introduced into the bay 40. When the dashboard assembly is thus assembled, the upper part of the upper housing portion 13 is disposed below a windscreen 52 of the vehicle, and the demist air vent 38 directs air from the second channel 29 over the windscreen 52 for demisting purposes.

It will thus be apparent that a dashboard assembly according to the present invention is a particularly flexible modular design. The lower housing portion can be made strong enough to support the dashboard assembly. Strength of the housing portion can be optimised by means of ribbing, injection struts, twin shot reinforcing armatures or by any other means as desired. The non-handedness of the design means that the dashboard assembly can be used for left or right hand drive vehicles, in particular by providing an interchangeable glove box unit and steering column assembly. The appearance of the dashboard assembly may be changed by appropriate selection of the upper housing portion 13, air vent moulding 33 and covers 51, and the distribution of air from the air blower system 23 may be adapted to the vehicle in which the assembly is to be stored by provided an appropriate intermediate housing portion 12. The non-handedness of the dashboard assembly 10 in the present example is further enhanced by the central, non-handed location of the instrument panel 52. The lower housing portion, intermediate housing portion and the upper housing portion may be connected by vibration or ultrasonic welding or by any other means as desired, whilst the all polymer assembly has desirable ductile/energy absorbing properties to accommodate ENCAP/head impact requirements. The dashboard assembly may be provided with suitable carrier hooks, concealed after installation to permit easy carriage during assembly.

In the present specification "comprise" means "includes or consists of" and "comprising" means "including or consisting of."

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

While the invention has been specifically described in connection with certain specific embodiments thereof, it is to be understood that this is by way of illustration and not of limitation, and the scope of the appended claims should be construed as broadly as the prior art will permit.

What is claimed is:

1. A dashboard assembly for a vehicle, comprising:
   a lower housing portion adapted to receive an air blower system;
   an upper housing portion; and
   an intermediate housing portion disposed between and attached to the lower housing portion and the upper housing portion,
   wherein the air blower system comprises at least one sleeve defining at least one outlet, and
   wherein the intermediate housing portion comprises at least one channel integrally provided in the intermediate housing portion, and
   wherein the intermediate housing portion comprises at least one connecting flange in flow connection with the at least one channel for connection to the at least one sleeve, and
   wherein the at least one channel includes an outlet, and
   wherein the upper housing portion comprises at least one air vent in flow communication with the outlet of the at least one channel.

2. A dashboard assembly according to claim 1, wherein the air vent of the upper housing portion comprises a demist air vent to direct air over a windscreen.

3. A dashboard assembly according to claim 1, further comprising a compartment air vent in flow communication with an outlet of the intermediate housing portion, whereby air is directed into a passenger compartment of the vehicle.

4. A dashboard assembly according to claim 3, wherein said compartment air vent comprises an air vent moulding sealingly secured between the intermediate housing portion and the upper housing portion in flow communication with said outlet.

5. A dashboard assembly according to claim 4, wherein the air vent moulding extends across a width of the dashboard assembly.

6. A dashboard assembly according to claim 1, wherein the intermediate housing portion comprises a first channel and a second channel integrally provided in the intermediate housing portion, the first channel being in flow communi cation with the compartment air vent, and the second channel being in flow communication with the demist air vent.

7. A dashboard assembly according to claim 6, wherein the air blower system comprises first and second sleeves, and wherein the intermediate housing portion comprises first and second connecting flanges for connection to the first and second sleeves, respectively, and wherein the first channel is in flow communication with the first connecting flange, and the second flow channel is in flow communication with the second connecting flange.

8. A dashboard assembly according to claim 1, wherein the air blower system is disposed centrally of the lower housing portion, and wherein the lower housing portion comprises symmetrically arranged bays for receiving at least one dashboard assembly module.

9. A dashboard assembly according to claim 8 wherein the dashboard assembly module comprises one of a glove box assembly and a steering column assembly.

10. A dashboard assembly according to claim 1, wherein the intermediate housing portion is symmetrical, and wherein the upper housing portion is symmetrical.

11. A dashboard assembly according to claim 1, wherein the lower housing portion reaches down to the region of a driver's knees.

12. A dashboard assembly according to claim 1, wherein the lower housing portion further comprises an integral body forming an open container with a joining edge on top.

* * * * *